(12) United States Patent
Li et al.

(10) Patent No.: US 10,534,234 B2
(45) Date of Patent: Jan. 14, 2020

(54) ARRAY SUBSTRATE AND DISPLAY PANEL

(71) Applicant: Xiamen Tianma Micro-Electronics Co., Ltd., Xiamen (CN)

(72) Inventors: Mingjuan Li, Xiamen (CN); Ling Wu, Xiamen (CN); Yanping Yu, Xiamen (CN); Ankai Ling, Xiamen (CN); Boping Shen, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 15/996,816

(22) Filed: Jun. 4, 2018

(65) Prior Publication Data
US 2019/0265564 A1 Aug. 29, 2019

(30) Foreign Application Priority Data
Feb. 26, 2018 (CN) .......................... 2018 1 0160398

(51) Int. Cl.
*G02F 1/1343* (2006.01)
*G02F 1/1362* (2006.01)
*G02F 1/1335* (2006.01)
*G09G 3/20* (2006.01)
*G02F 1/1368* (2006.01)

(52) U.S. Cl.
CPC .. *G02F 1/136286* (2013.01); *G02F 1/133514* (2013.01); *G02F 1/134336* (2013.01); *G09G 3/2003* (2013.01); *G02F 1/1368* (2013.01); *G02F 2001/134354* (2013.01);
(Continued)

(58) Field of Classification Search
CPC . H01L 27/12; H01L 27/1214; H01L 27/1296; H01L 27/1218; H01L 27/124; G02F 1/136286; G02F 1/133514; G02F 1/134336; G02F 2201/123; G02F 2001/134354; G02F 2201/52;
(Continued)

(56) References Cited

U.S. PATENT DOCUMENTS

2005/0128413 A1* 6/2005 Son .................... G02F 1/134363
349/143
2016/0209716 A1* 7/2016 Kim .................... G02F 1/134309
2016/0223857 A1* 8/2016 Im ...................... G02F 1/133514

FOREIGN PATENT DOCUMENTS

CN 1869772 A 11/2006

* cited by examiner

*Primary Examiner* — Thanh T Nguyen
(74) *Attorney, Agent, or Firm* — Tarolli, Sundheim, Covell & Tummino LLP

(57) ABSTRACT

The present disclosure provides an array substrate and a display panel containing the array substrate. The array substrate includes a plurality of pixel regions, and pixel electrodes and thin film transistors one-to-one corresponding thereto. Each pixel electrode includes a pixel sub-electrode and an electrode connecting structure disposed in a corresponding pixel region, and a drain electrode of each thin film transistor is electrically connected to a corresponding pixel sub-electrode. The plurality of pixel regions includes at least one first-color pixel region and at least one second-color pixel region alternately arranged along a first direction and at least one third-color pixel region and at least one highlight pixel region alternately arranged along a first direction. A drain electrode is electrically connected to a pixel sub-electrode disposed in one of the at least one third-color pixel region is disposed in a highlight pixel region adjacent to the third-color pixel region.

19 Claims, 8 Drawing Sheets

(52) U.S. Cl.
CPC .. *G02F 2201/122* (2013.01); *G02F 2201/123* (2013.01); *G02F 2201/52* (2013.01); *G09G 2300/0452* (2013.01)

(58) Field of Classification Search
CPC ............ G02F 2201/122; G02F 1/1368; G09G 3/2003; G09G 2300/0452
See application file for complete search history.

ARRAY SUBSTRATE AND DISPLAY PANEL

CROSS-REFERENCE TO RELATED APPLICATIONS

The present disclosure claims priority to Chinese Patent Application No. 201810160398.3, filed on Feb. 26, 2018, the content of which is incorporated herein by reference in its entirety.

TECHNICAL FIELD

The present disclosure relates to the field of display technologies, and in particular, to an array substrate and a display panel including the array substrate.

BACKGROUND

In the field of display technologies, achievement of low power consumption and achievement of high brightness have become two hot research topics now. On the basis of the traditional achievement of color images by means of red, green and blue pixels, the low power consumption and high brightness can be achieved by adding white pixels.

In the related art, pixel regions of an array substrate for displaying red, blue, green, and white colors respectively correspond to a first-color pixel region, a second-color pixel region, a third-color pixel region, and a highlight pixel region. Generally, the first-color pixel region, the second-color pixel region, and the third color pixel region have a same area, and the highlight pixel region has a smaller area. Since the highlight pixel region has a relatively small area, the gate line or the data line usually needs to be designed into a bending line structure. The area of the highlight pixel region being smaller than that of the other color pixel region is achieved by reducing a width of the highlight pixel region. In this case, the corresponding partial data lines need to be designed to have a bending structure. When the gate line or data line is designed to have a bending structure, there is necessarily a risk of disconnection.

SUMMARY

The present disclosure provides an array substrate and a display panel including the array substrate so as to solve the above problems.

In a first aspect, the present disclosure provides an array substrate. The array substrate includes a plurality of gate lines arranged along a first direction and a plurality of data lines arranged along a second direction. The plurality of gate lines intersects the plurality of data lines to define a plurality of pixel regions. The array substrate includes a plurality of pixel electrodes, each of which includes a pixel sub-electrode and an electrode connecting structure connected to the pixel electrode. The plurality of pixel electrodes corresponds to the plurality of pixel regions in one-to-one correspondence, such that each pixel sub-electrode is disposed in a corresponding pixel region of the plurality of pixel regions. The array substrate includes a plurality of thin film transistors. The plurality of thin film transistors corresponds to the plurality of pixel electrodes in one-to-one correspondence. A drain electrode of each of the plurality of thin film transistors is electrically connected to a pixel sub-electrode of a corresponding pixel electrode of the plurality of pixel electrodes through a first through-hole and an electrode connecting structure of a corresponding pixel electrode of the plurality of pixel electrodes. The plurality of pixel regions include at least one first-color pixel region, at least one second-color pixel region, at least one third-color pixel region, and at least one highlight pixel region. The at least one first-color pixel region and the at least one second-color pixel region are alternately arranged along the first direction. The at least one third-color pixel region and the at least one highlight pixel region are alternately arranged along the first direction. The at least one first-color pixel region and the at least one second-color pixel region have a same area, and the at least one third-color pixel region and the at least one highlight pixel region have a same area. A drain electrode, which is electrically connected to a pixel sub-electrode disposed in one third-color pixel region of the at least one third-color pixel region, is disposed in a highlight pixel region adjacent to the one third-color pixel region.

In a second aspect, the present disclosure provides a display panel including an array substrate. The array substrate includes a plurality of gate lines arranged along a first direction and a plurality of data lines arranged along a second direction. The plurality of gate lines intersects the plurality of data lines to define a plurality of pixel regions. The array substrate includes a plurality of pixel electrodes, each of which includes a pixel sub-electrode and an electrode connecting structure connected to the pixel electrode. The plurality of pixel electrodes corresponds to the plurality of pixel regions in one-to-one correspondence, such that each pixel sub-electrode is disposed in a corresponding pixel region of the plurality of pixel regions. The array substrate includes a plurality of thin film transistors. The plurality of thin film transistors corresponds to the plurality of pixel electrodes in one-to-one correspondence. A drain electrode of each of the plurality of thin film transistors is electrically connected to a pixel sub-electrode of a corresponding pixel electrode of the plurality of pixel electrodes through a first through-hole and an electrode connecting structure of a corresponding pixel electrode of the plurality of pixel electrodes. The plurality of pixel regions include at least one first-color pixel region, at least one second-color pixel region, at least one third-color pixel region, and at least one highlight pixel region. The at least one first-color pixel region and the at least one second-color pixel region are alternately arranged along the first direction. The at least one third-color pixel region and the at least one highlight pixel region are alternately arranged along the first direction. The at least one first-color pixel region and the at least one second-color pixel region have a same area, and the at least one third-color pixel region and the at least one highlight pixel region have a same area. A drain electrode, which is electrically connected to a pixel sub-electrode disposed in one third-color pixel region of the at least one third-color pixel region, is disposed in a highlight pixel region adjacent to the one third-color pixel region.

DESCRIPTION OF EMBODIMENTS

In order to make the purposes, features and advantages of the present disclosure more understandable, the present disclosure will be further described with reference to the accompanying drawings and embodiments.

It should be noted that details are provided in the following description so as to better illustrate the present disclosure, however, the present disclosure can be implemented in various other manners different from those described herein, and a person skilled in the art may make similar promotions without departing from the content of the present disclosure. Therefore, the present disclosure is not limited by the embodiments disclosed in the following.

Figure 1:
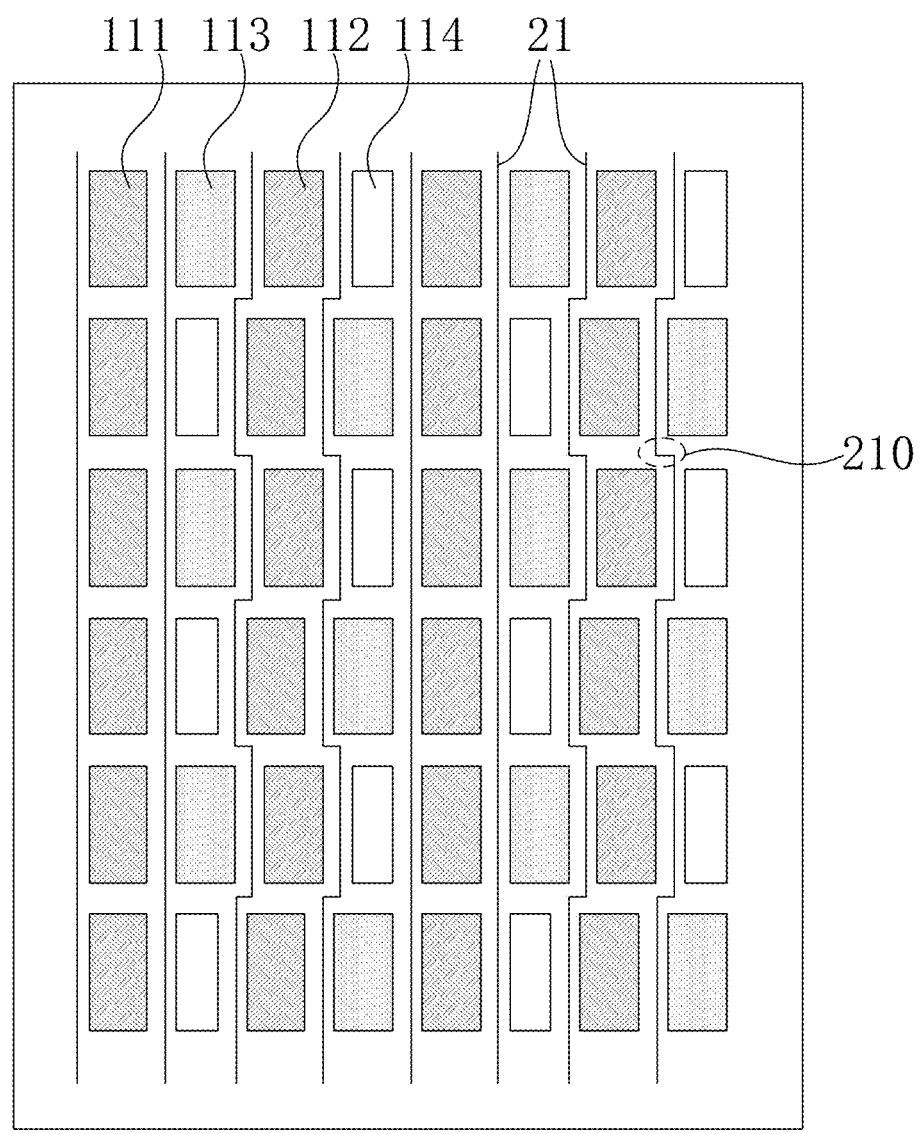
FIG. 1 is a schematic diagram of an array substrate in the related art.

As shown in FIG. 1, FIG. 1 is a schematic diagram of an array substrate in the related art. Pixel regions of the array substrate for displaying red, blue, green, and white respectively correspond to a first-color pixel region 111, a second-color pixel region 112, a third-color pixel region 113, and a highlight pixel region 114. Generally, the first-color pixel region 111, the second-color pixel region 112, and the third-color pixel region 113 have a same area, and the highlight pixel region 114 has a smaller area. Since the highlight pixel region 114 has a relatively small area, the gate line or the data line usually needs to be designed into a bending line structure. As shown in FIG.1, the area of the highlight pixel region 114 being smaller than that of the other color pixel region is achieved by reducing a width of the highlight pixel region 114, and in this case, the corresponding partial data lines 21 need to be designed into a bending line structure, for example, a bending line structure at position 210. When the gate line or data line is designed into a bending line structure, there may be a disconnection risk.

Figure 2:
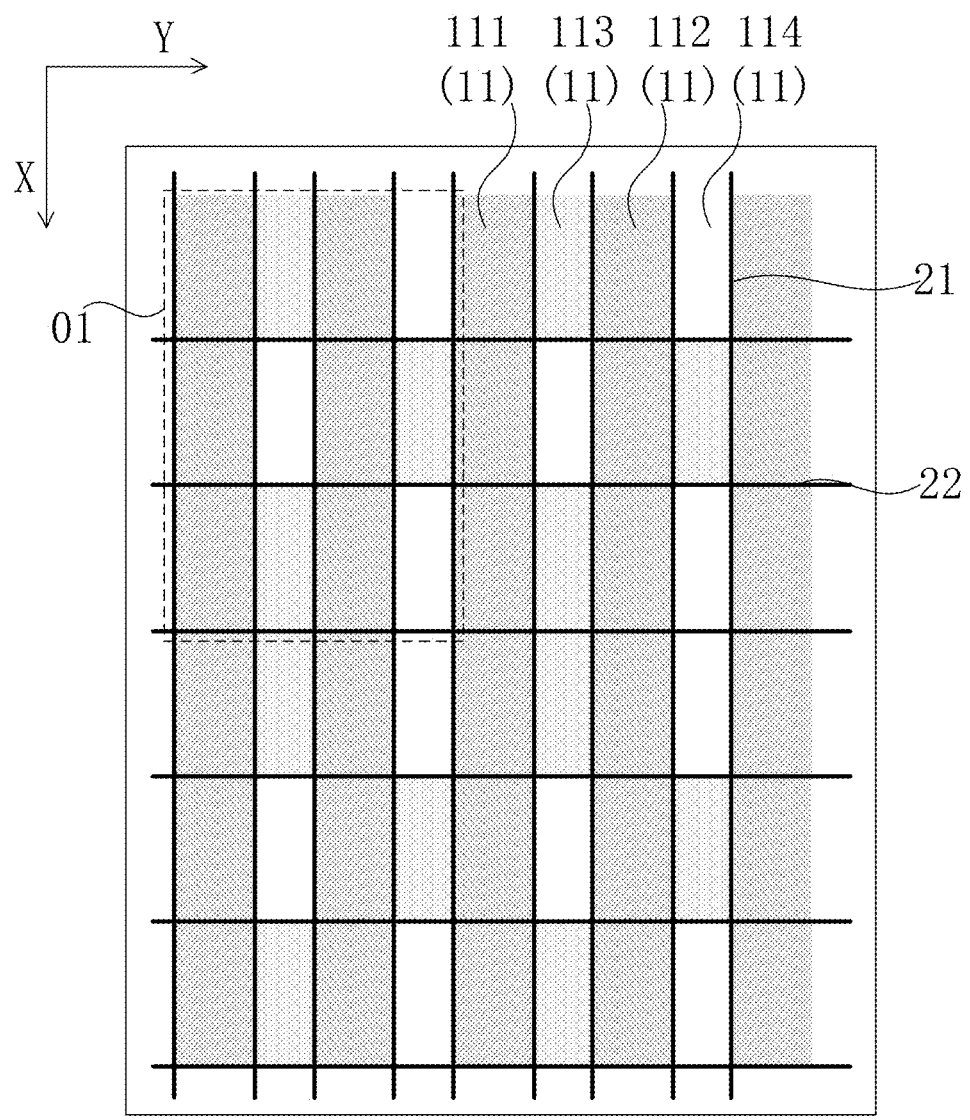
FIG. 2 is a schematic diagram of an array substrate according to an embodiment of the present disclosure.

The present disclosure provides an array substrate, with reference to FIG. 2, which is a schematic diagram of an array substrate according to an embodiment of the present disclosure. The array substrate includes: a plurality of gate lines 22 arranged along a first direction X and a plurality of data lines 21 arranged along a second direction Y. Further, an extending direction of the data line 21 is different from an extending direction of the gate line 22. Preferably, the extending direction of the data line 21 is perpendicular to the extending direction of the gate line 22, and optionally, the data line 21 extends along the first direction X and the gate line extends along the second direction Y. It should be noted that the first direction X is not parallel to the second direction Y, and preferably, the first direction X is perpendicular to the second direction Y. It should be further noted that the data line 21 or the gate line 22 is not limited to a linear structure, and therefore, it is understood that the data line 21 extending along the first direction X herein means that the data line 21 may be in a non-linear structure and its overall extending direction is the first direction X, and the gate line 22 extending along the second direction Y herein means that the gate line 22 may be in a non-linear structure and its overall extending direction is the second direction Y. As shown in FIG. 2, both the data line 21 and the gate line 22 are in a linear structure and extend respectively along the first direction X and along the second direction Y.

With further reference to FIG. 2, the plurality of gate lines 22 intersects the plurality of data lines 21 to define a plurality of pixel regions 11. The plurality of pixel regions 11 correspond to four displaying colors of the array substrate. The plurality of pixel regions 11 includes first-color pixel regions 111, second-color pixel regions 112, third-color pixel regions 113, and highlight pixel regions 114. The first-color pixel regions 111 and the second-color pixel regions 112 are alternately arranged along the first direction X, and the third-color pixel regions 113 and the highlight pixel regions 114 are alternately arranged along the first direction X, i.e., the first-color pixel regions 111 and the second-color pixel regions 112 can be located in a same column, and the third-color pixel regions 113 and the highlight pixel regions 114 can be located in a same column.

Further, the first-color pixel region 111 and the second-color pixel region 112 have a same area, while the third-color pixel region 113 and the highlight pixel region 114 have a same area. The first-color pixel region 111, the second-color pixel region 112, the third-color pixel region 113, and the highlight pixel region 114 have a same height along the first direction X, and a width of the first-color pixel region 111 along the second direction Y is larger than a width of the third-color pixel region 113 along the second direction Y. That is, the first-color pixel region 111 and the second-color pixel region 112 located in a same column have a same width along the second direction Y, and the third-color pixel region 113 and the highlight pixel region 114 located in a same column have a same width along the second direction Y Preferably, the width of the first-color pixel region 111 and the second-color pixel region 112 along the second direction Y is larger than the width of the third-color pixel region 113 and the highlight pixel region 114 along the second direction Y. In this way, pixel regions 11 in a same column have a same width, the layout of pixels is simple, and the wiring manner of the data lines 21 and the gate lines 22 is simple, and the bending times of the data lines 21 and the gate lines 22 are decreased, thereby alleviating the disconnection risk. Moreover, the area of the highlight pixel region 114 is smaller than both the area of the first-color pixel region 111 and the area of the second-color pixel region 112, so as to avoid display non-uniformity due to the high brightness of the highlight pixel region.

With further reference to FIG. 2, the first-color pixel regions 111 and the second-color pixel regions 112 are alternately disposed along the second direction Y, and the third-color pixel regions 113 and the highlight pixel regions 114 are alternately disposed along the second direction Y, and any one of the first-color pixel regions 111 is disposed adjacent to a respective one of the third-color pixel regions 113 along the second direction Y. That is, as shown in FIG. 2, in a same row, the first-color pixel region 111, the third-color pixel region 113, the second-color pixel region 112, and the highlight pixel region 114 are sequentially disposed along the second direction Y. Moreover, the first-color pixel regions 111 and the second-color pixel regions 112 are alternately arranged along the first direction X, and the third-color pixel regions 113 and the highlight pixel regions 114 are alternately arranged along the first direction X. Therefore, pixel regions 11 in adjacent rows are staggered by two pixels along the second direction, that is, as shown in FIG. 2, pixel regions 11, which are aligned with a first-color pixel region 111, a second-color pixel region 112, a third-color pixel region 113, and a highlight pixel region 114 in the first row along the first direction X, are respectively a second-color pixel region 112, a first-color pixel region 111, a highlight pixel region 114, and a third-color pixel region 113. This design makes the layout of highlight pixel regions 114 in the array substrate more dispersive and uniformly distributed, thereby achieving the better display uniformity.

Figure 3:
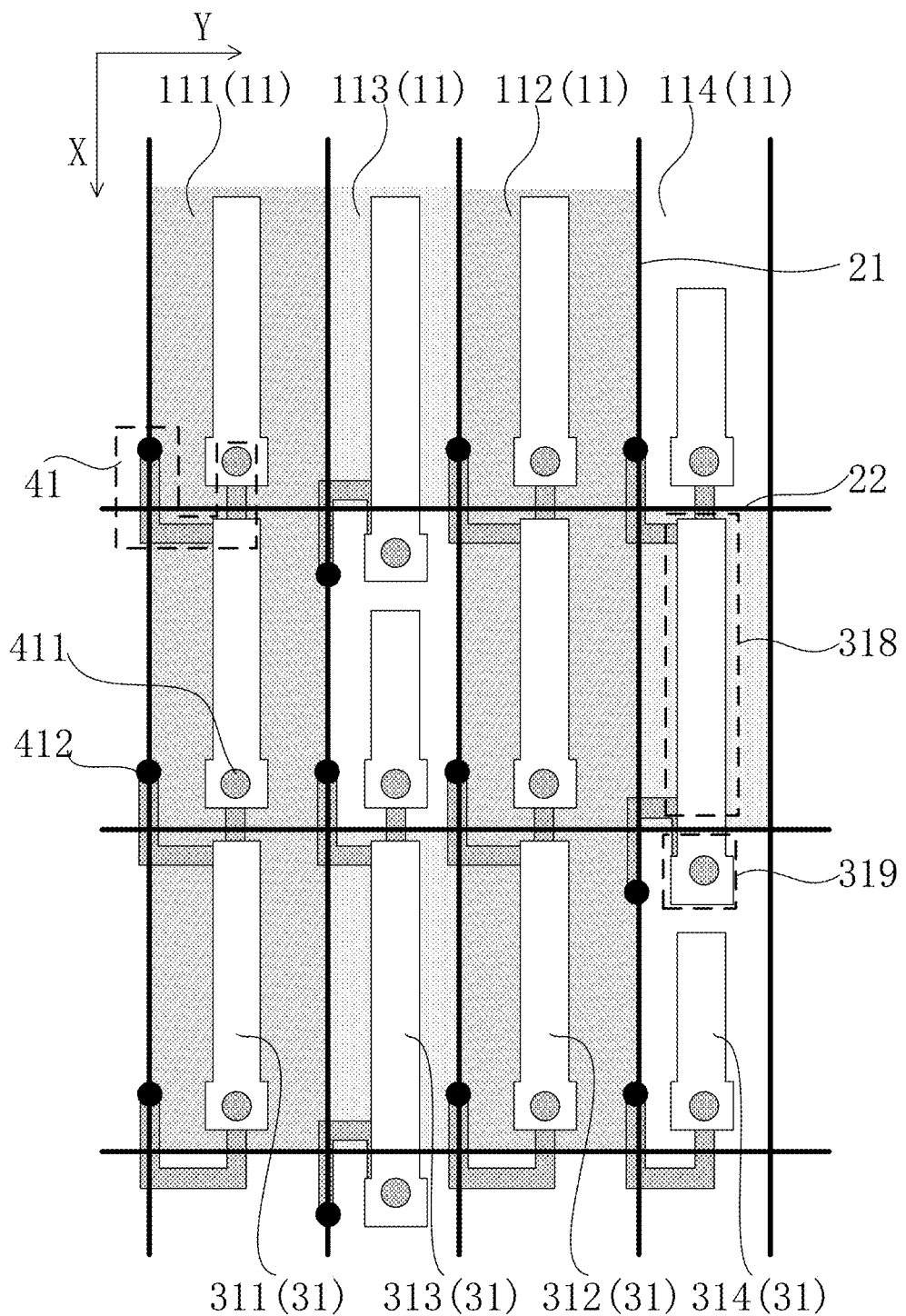
FIG. 3 is a partial enlarged view of 01 of the array substrate in FIG. 2.

For illustrating structures in the array substrate, please refer to FIG. 3. FIG. 3 is a partial enlarged view of 01 of the array substrate in FIG. 2. The array substrate further includes a plurality of pixel electrodes 31 and a plurality of thin film transistors 41 in one-to-one correspondence with the plurality of pixel electrodes 31. The plurality of pixel electrodes 31 corresponds to the above-mentioned plurality of pixel regions 11 in one-to-one correspondence, and the plurality of thin film transistors 41 corresponds to the plurality of pixel electrodes 31 in one-to-one correspondence. That is, each of the plurality of pixel electrodes 31 corresponding to a respective one of the plurality of pixel regions 11 is electrically connected to a corresponding thin film transistor 41.

Each pixel electrode 31 includes a pixel sub-electrode 318 and an electrode connecting structure 319 connected to the pixel sub-electrode 318, and the pixel sub-electrode 318 is disposed in a corresponding pixel region 11. Each thin film transistor 41 includes a source electrode and a drain electrode, the drain electrode is electrically connected to the pixel electrode 31 through the first through-hole 411, and the source electrode is electrically connected to the data line 21 through the second through-hole 412. It should be noted that the source electrode and the drain electrode of the thin film transistor 41 are not marked, but it is commonly known that the source electrode is a portion of the thin film transistor 41 corresponding to a position of the second though-hole 412, and the drain electrode is a portion of the thin film transistor 41 corresponding to a position of the first though-hole 411.

The pixel sub-electrode 318 of the pixel electrode 31 is used to receive a display voltage during a display stage so as to form an electric field with other electrodes (e.g., a common electrode), thereby achieving display. The electrode connecting structure 319 of the pixel electrode 31 is mainly used to be connected to the drain electrode of the thin film transistor 41, that is, the drain electrode of the thin film transistor 41 is electrically connected to the pixel sub-electrode 318 of the corresponding pixel electrode 31 through the first through-hole 411 and the electrode connecting structure 319.

Further, a corresponding drain electrode, which is electrically connected to a pixel sub-electrode 318 disposed in any third-color pixel region 113, is disposed in the adjacent highlight pixel region 114. That is, a pixel electrode 31 corresponding to a third-color pixel region 113 is a third-color pixel electrode 313, which has a pixel sub-electrode 318 disposed in the third-color pixel region 113 and an electrode connecting structure 319 disposed in a highlight pixel region 114 which is adjacent to the third-color pixel region 113. As shown in FIG. 3, in a third-color pixel region 113 and a highlight pixel region 114 which are adjacently arranged along a column direction, a third-color pixel electrode 313 corresponding to the third-color pixel region 113 occupies a partial region of the highlight pixel region 114, and thus an area of another partial region of the highlight pixel region 114 occupied by a pixel electrode 31 (i.e., a highlighted pixel electrode 314) corresponding to the highlight pixel region 114 is relatively decreased. In this case, an area actually displayed by the highlight pixel region 114 as a highlight pixel is smaller than an area actually displayed by the third-color pixel region 113 as a third-color pixel, so as to prevent the brightness of the highlight pixel region 114 from being much higher than the brightness of the third-color pixel region 113, which would otherwise influence the display effect.

It should be noted that the plurality of data lines 21 of the array substrate provided by the present disclosure have a same shape and the plurality of gate lines are all in a linear structure extending along the second direction Y.

In addition, with this design, the brightness of the third-color pixel region 113 and the brightness of the highlight pixel region 114 can be uniform without changing the height of the third-color pixel region 113 and the height of the highlight pixel region 114 in a same column. Meanwhile, since the height of the third-color pixel region 113 and the height of the highlight pixel region 114 do not change, the corresponding gate line 22 does not need to be changed, which leads to the simple process without increasing the disconnection risk of the gate line 22.

With further reference to FIG. 3, a pixel electrode 31 disposed in any of the first-color pixel regions 111 is a first-color pixel electrode 311, and a pixel electrode 31 disposed in any of the second-color pixel regions 112 is a second-color pixel electrode 312. A first-color pixel electrodes 311 and the drain electrode of the thin film transistor 41 correspondingly electrically connected to the first-color pixel electrodes 311 are located in a same pixel region 11; a second-color pixel electrodes 312 and the drain electrode of the thin film transistor 41 correspondingly electrically connected to the second-color pixel electrode 312 are located in a same pixel region 11; and a highlight pixel electrodes 314 and the drain electrode of the thin film transistor 41 correspondingly electrically connected to the highlight pixel electrodes 314 are located in a same pixel region 11. That is, a first color pixel electrode 311, a second color pixel electrode 312, and a highlight pixel electrode 314, and a respective drain electrode of the thin film transistor 41 correspondingly electrically connected to the first color pixel electrode 311, the second color pixel electrode 312, and the highlight pixel electrode 314, are respectively disposed in a first-color pixel region 111, a second-color pixel region 112, and a highlight pixel region 114.

Both the pixel sub-electrode 318 and the electrode connecting structure 319 of the first-color pixel electrode 311 are disposed in the first-color pixel region 111, and both the pixel sub-electrode 318 and the electrode connecting structure 319 of the second-color pixel electrode 312 are disposed in the second-color pixel region 112. That is, both the electrode connecting structure 319 and the drain electrode of the thin film transistor 41 corresponding to the first-color pixel electrode 311 are disposed in the first-color pixel region 111, both the electrode connecting structure 319 and the drain electrode of the thin film transistor 41 corresponding to the second-color pixel electrode 312 are disposed in the second-color pixel region 112. Therefore, an area actually displayed by the first-color pixel region 111 as the first-color pixel is smaller than an area of the first-color pixel region 111, an area actually displayed by the second-color pixel region 112 as the second-color pixel is smaller than an area of the second-color pixel region 112, and the third-color pixel region 113 is not provided therein with the electrode connecting structure 319 of the third-color pixel electrode 311 or the drain electrode of the thin film transistor 41. Thus, the electrode connecting structure 319 of the third-color pixel electrode 311 and the drain electrode of the thin film transistor 41 do not have any influence on an area actually displayed by the third-color pixel region 113 as the third-color pixel. Therefore, the first-color pixel region 111 and the second-color pixel region 112 respectively have a different width from the third-color pixel region 113, but there is no significant difference in the areas actually displayed by the first-color pixel, the second-color pixel, and the third-color pixel, thereby avoiding a color cast problem.

Figure 4:
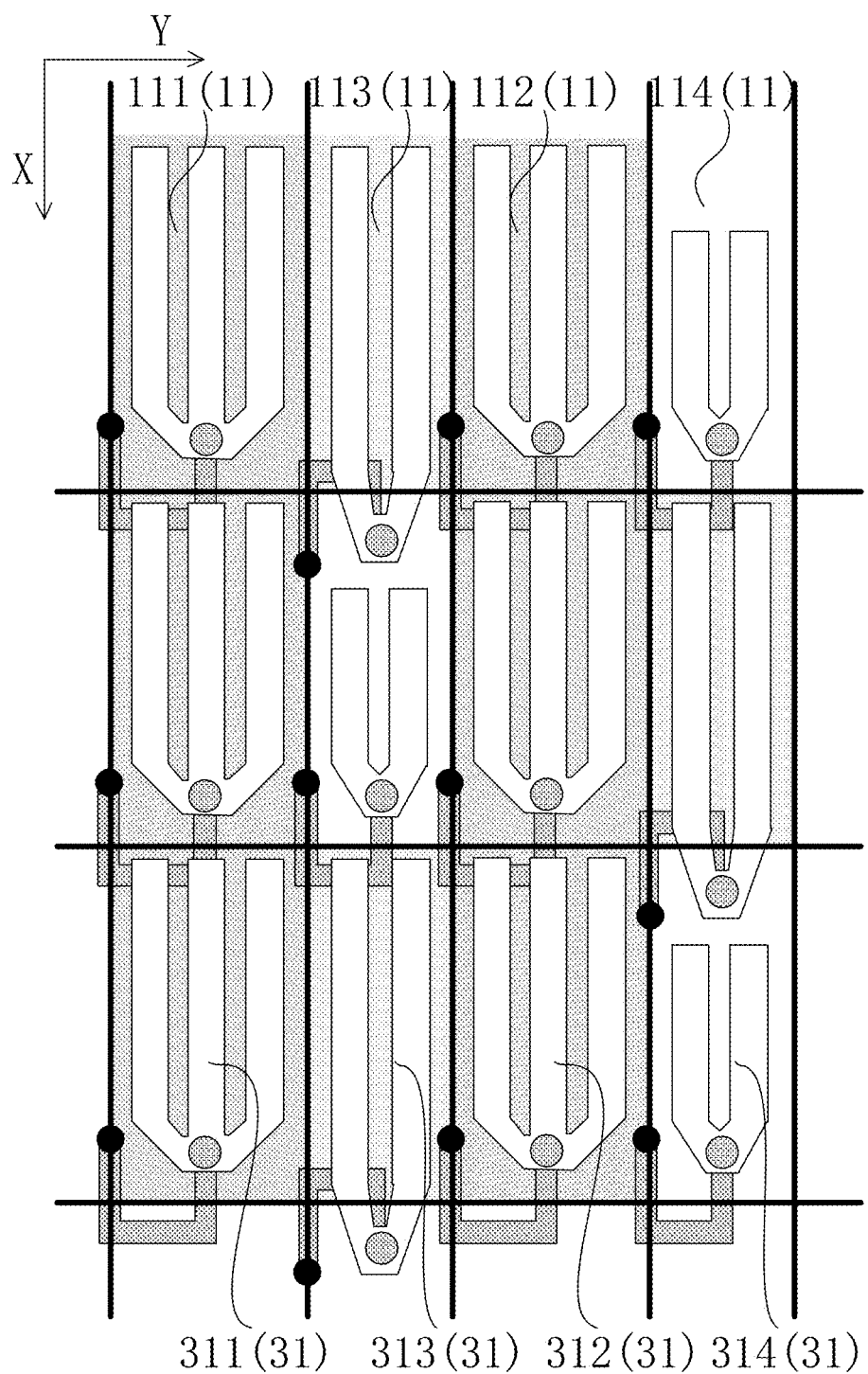
FIG. 4 is a schematic diagram of another array substrate according to an embodiment of the present disclosure.

The first-color pixel electrode 311, the second-color pixel electrode 312, the third-color pixel electrode 313, and the highlight pixel electrode 314 can also include at least one slit. As shown in FIG. 4, FIG. 4 is a schematic diagram of another array substrate according to an embodiment of the present disclosure. The first-color pixel electrode 311 and the second-color pixel electrode 312 each includes two slits, and the third-color pixel electrode 313 and the highlight pixel electrode 314 each includes one slit. The present disclosure neither limits whether the numbers of slits included in the first-color pixel electrode 311, the second-color pixel electrode 312, the third-color pixel electrode 313 and the highlight pixel electrode 314 are equal or not, nor limits the respective specific numbers of slits. By providing the slit(s), the display color gamut and transmittance can be controlled more flexibly.

Figure 5:
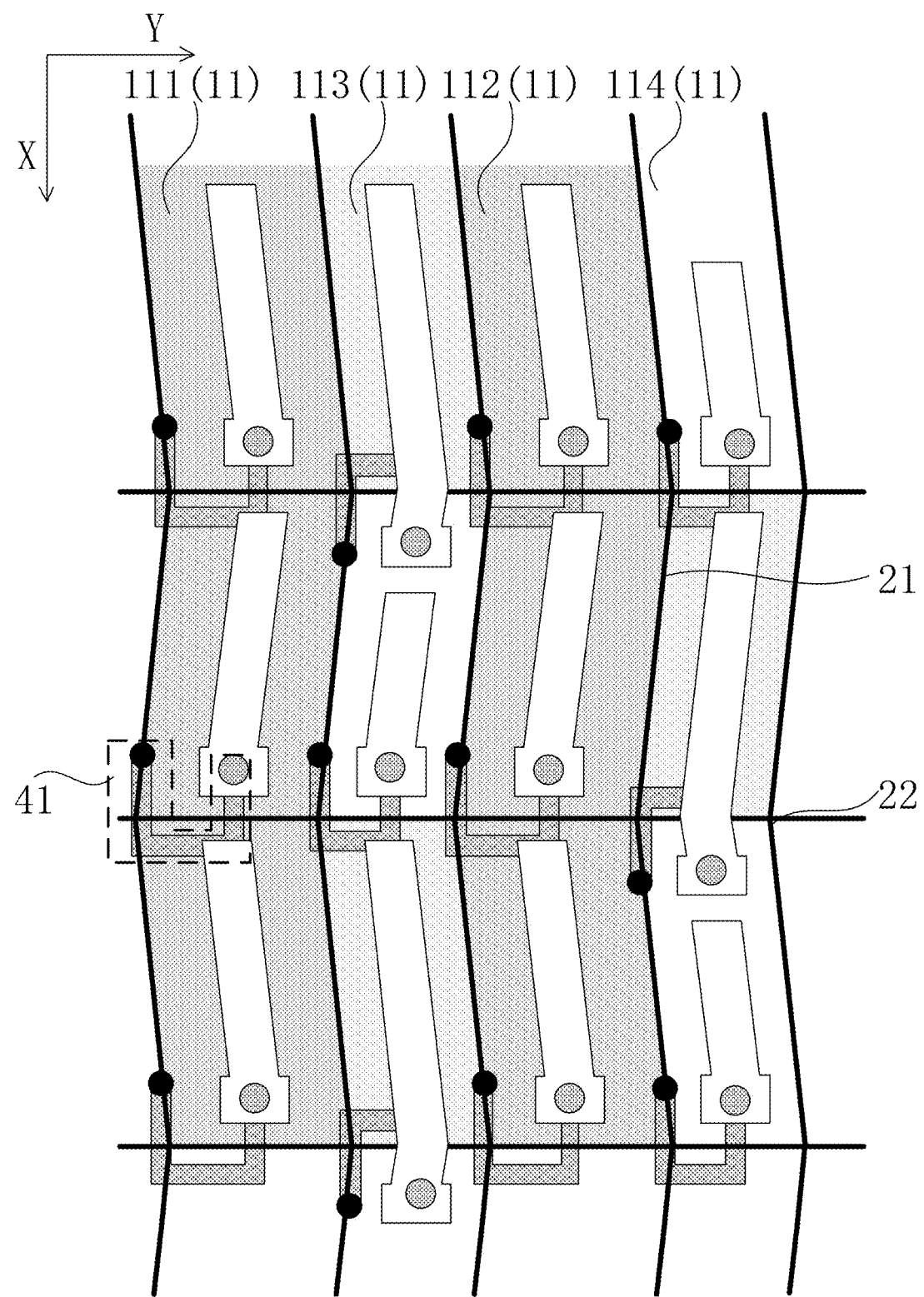
FIG. 5 is a schematic diagram of still another array substrate according to an embodiment of the present disclosure.

The array substrate provided by the present disclosure can be in a true dual-domain structure or a puppet dual-domain structure, which will not be limited herein by the present disclosure. With reference to FIG. 5, FIG. 5 is a schematic diagram of still another array substrate according to an embodiment of the present disclosure. The array substrate shown in FIG. 5 is a puppet dual-domain structure, i.e., two adjacent pixel regions 11 in a same column form a "V" structure, and two adjacent pixel electrodes 31 in a same column also form a "V" structure. It should be noted that, in this case, the gate line 22 is still in a linear structure, and the data line 21 is a bending line structure. However, since the third-color pixel region 113 and the highlight pixel region 114 in a same column have a same width, the data line 21 only needs to be bent for adapting to the "V" structure formed by the adjacent pixel regions 11 in a same column without being bent in other manners. Thus, for a data line 21 on any side of the highlight pixel region 114, a portion of the data line 21 adjacent to the highlight pixel region 114 is a linear structure. This can reduce the disconnection risk even in the design of puppet dual-domain.

Preferably, as shown in FIG. 3 and FIG. 5, the area of the pixel sub-electrode 318 disposed in the first-color pixel region 111 is equal to the area of the pixel sub-electrode 318 disposed in the second-color pixel region 112, and the area of the pixel sub-electrode 318 disposed in the third-color pixel region 113 is larger than the area of the pixel sub-electrode 318 disposed in the highlight pixel region 114.

Optionally, as shown in FIGS. 3-5, the height of the pixel sub-electrode 318 disposed in the first-color pixel region 111 along the first direction X is equal to the height of the pixel sub-electrode 318 disposed in the second-color pixel region 112 along the first direction X, and the height of the pixel sub-electrode 318 disposed in the third-color pixel region 113 along the first direction X is larger than the height of the pixel sub-electrode 318 disposed in the highlight pixel region 114 along the first direction X.

Optionally, as shown in FIG. 3 and FIG. 5, the width of the pixel sub-electrode 318 disposed in the third-color pixel region 113 along the second direction Y is equal to the width of the pixel sub-electrode 318 disposed in the highlight pixel region 114 along the second direction Y.

Figure 6:
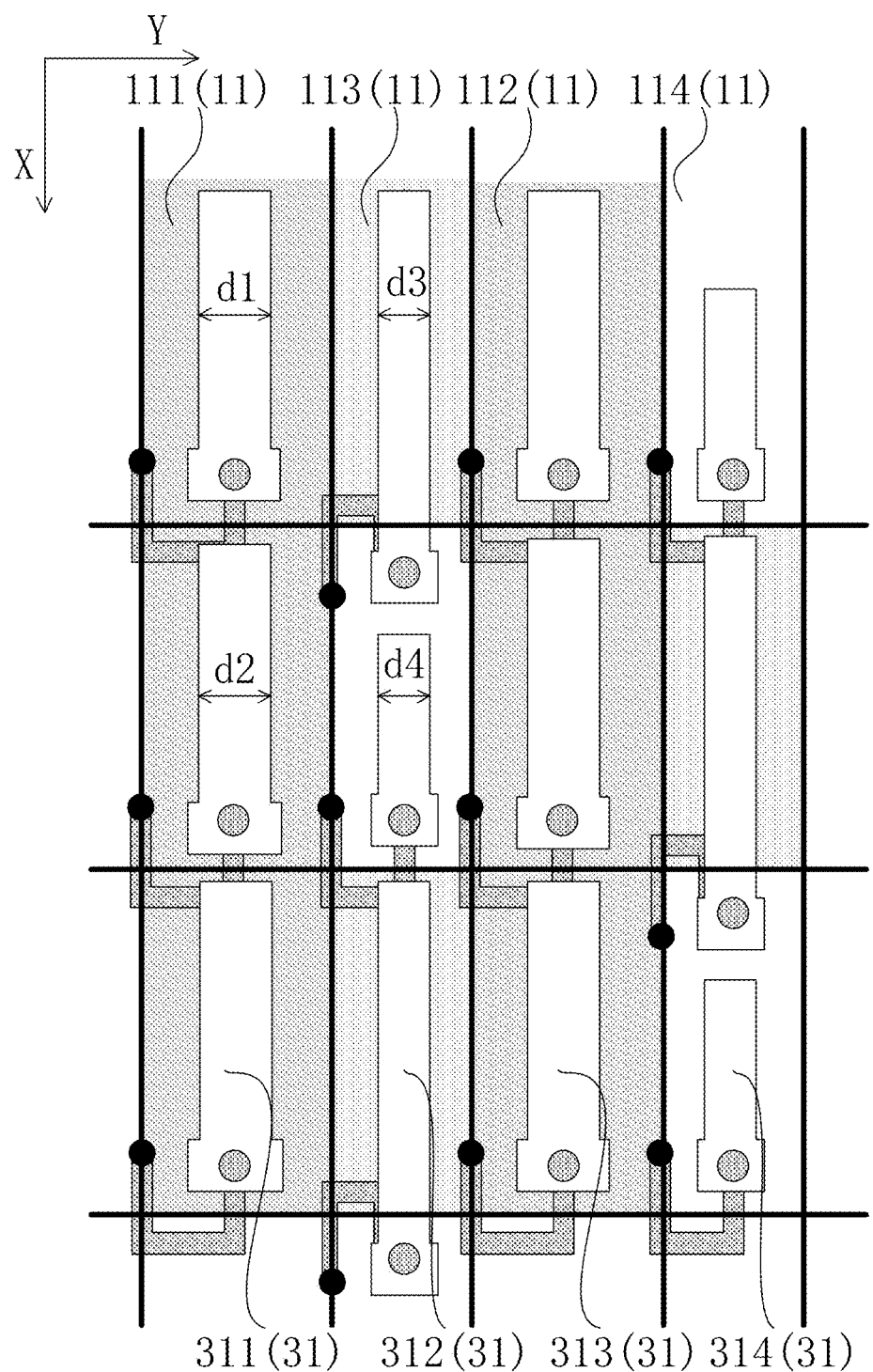
FIG. 6 is a schematic diagram of still another array substrate according to an embodiment of the present disclosure.

Optionally, the width of the pixel sub-electrode 318 disposed in the first-color pixel region 111 along the second direction Y is larger than the width of the pixel sub-electrode disposed in the third-color pixel region along the second direction Y. As shown in FIG. 6, FIG. 6 is a schematic diagram of still another array substrate according to an embodiment of the present disclosure. The width of the pixel sub-electrode 311 disposed in the first-color pixel region 111 along the second direction Y is d1, the width of the sub-electrode 312 disposed in the second-color pixel region 112 along the second direction Y is d2, the width of the pixel sub-electrode 313 disposed in the third-color pixel region 113 along the second direction Y is d3, and the width of the pixel sub-electrode 314 disposed in the high pixel region 114 along the second direction Y is d4, where d1=d2, d3=d4, d1>d3.

By setting the width and height of the pixel sub-electrode 318, the display color gamut and transmittance can be more flexibly controlled. The specific width and height of each pixel sub-electrode 318 disposed in each pixel region 11 will not be limited by the present disclosure.

It should be noted that the thin film transistor 41 can be in a dual-gate structure or a single-gate structure, which will not be limited by the present disclosure. It is taken as an example in the present disclosure that the thin film transistor 41 is a dual-gate structure. Optionally, as shown in FIG. 3, the thin film transistor 41 with a dual-gate structure is formed in a "U" structure, in which an opening direction of the respective thin film transistor 41 corresponding to the first-color pixel region 111, the second-color pixel region 112, and the highlight pixel region 114 is opposite to an opening direction of the thin film transistor 41 corresponding to the third-color pixel region 113. Since the opening direction of the thin film transistor 41 corresponding to the highlight pixel region 114 is opposite to the opening direction of the thin film transistor 41 corresponding to the third-color pixel region 113, both the source electrode of the thin film transistor 41 corresponding to the highlight pixel region 114 and the source electrode of the thin film transistor 41 corresponding to the third-color pixel region 113 are located on one side of the highlight pixel region 114. Such a design is to allow both the drain electrode of the thin film transistor 41 corresponding to the highlight pixel region 114 and the drain electrode of the thin film transistor 41 corresponding to the third-color pixel region 113 to be disposed in the highlight pixel region 114. When the thin film transistor 41 is in a single-gate structure, in order to allow both the drain electrode of the thin film transistor 41 corresponding to the highlight pixel region 114 and the drain electrode of the thin film transistor 41 corresponding to the third-color pixel region 113 to be disposed in the highlight pixel region 114, both the source electrode of the thin film transistor 41 corresponding to the highlight pixel region 114 and the source electrode of the thin film transistor 41 corresponding to the third-color pixel region 113 are located on a lower side of the third-color pixel region 113.

Optionally, the first-color pixel region 111 is a red pixel region, the second-color pixel region 112 is a blue pixel region, the third-color pixel region 113 is a green pixel region, and the highlight pixel region 114 is a white pixel region. That is, the arrangement manner of the pixel regions 11 of the array substrate lies in that along the second direction Y, the red pixel regions and the blue pixel regions are alternately disposed, the green pixel regions and the white pixel regions are alternately disposed, and any one of red pixel regions is disposed adjacent to a respective one of the green regions; and in that the first-color pixel regions 111 and the second-color pixel regions 112 are alternately arranged along the first direction X, and the third-color pixel regions 113 and the highlight pixel regions 114 are alternately arranged along the first direction X. When the highlight pixel region 114 is a white pixel region, it is easier to achieve high brightness display of the array substrate.

Figure 7:
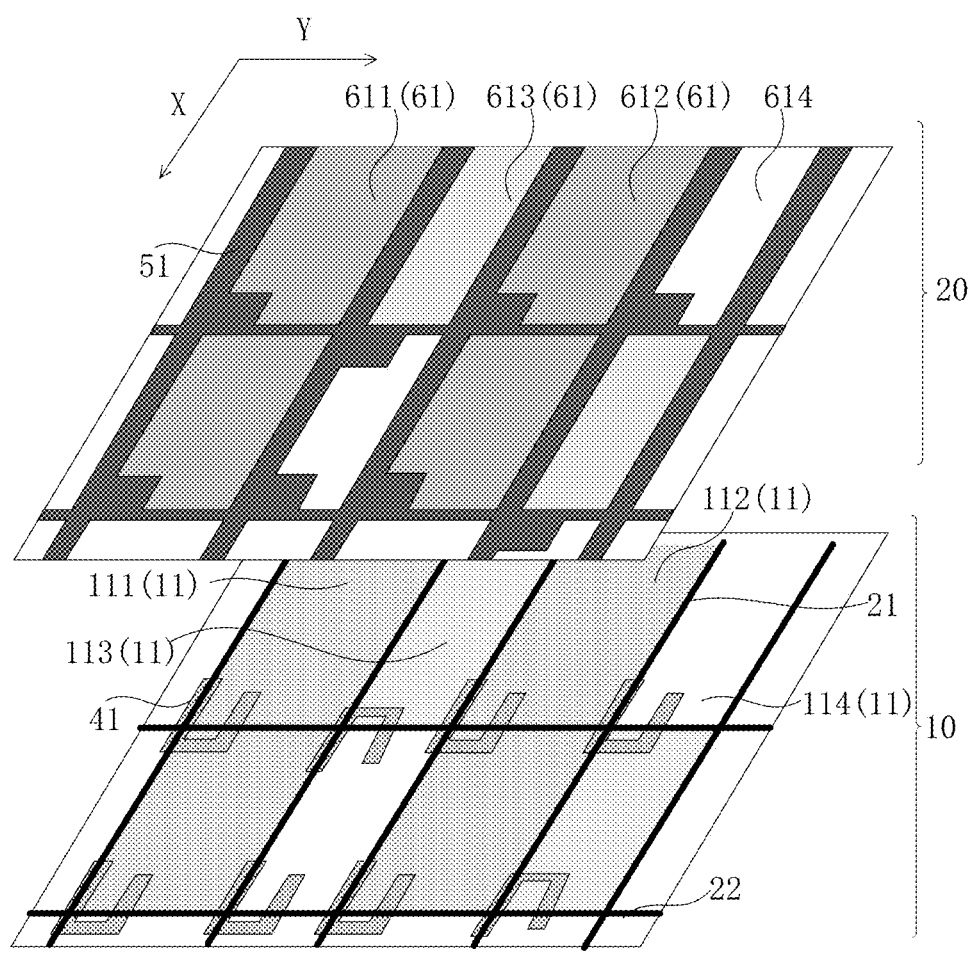
FIG. 7 is a schematic diagram of a display panel according to an embodiment of the present disclosure.

In addition, the present disclosure provides a display panel. With reference to FIG. 7, FIG. 7 is a schematic diagram of a display panel according to an embodiment of the present disclosure. The display panel includes an array substrate 10, and the array substrate can be any one of the array substrates provided in the previous embodiments, which will not be further described herein. The display panel further includes a color film substrate 20, and the array substrate 10 is disposed opposite to the color film substrate 20. Optionally, a liquid crystal layer can be provided between the array substrate 10 and the color film substrate 20, that is, the display panel is a liquid crystal display panel.

The color film substrate 20 includes a grid-like black matrix 51 and a plurality of color resists 61 and a plurality of blank regions 614. The grid-like black matrix 51 includes a plurality of hollow positions, and the plurality of color resists 61 and the plurality of blank regions 614 are disposed at the plurality of hollow positions. The plurality of color resists 61 are arranged in one-to-one correspondence with the plurality of pixel regions 11, and the plurality of blank regions 614 are arranged in one-to-one correspondence with the plurality of pixel regions 11. A first-color resist 611 is arranged as corresponding to a respective one first-color pixel region 111, a second-color resist 612 is arranged as corresponding to a respective one second-color pixel region 112, a third color resist 613 is arranged as corresponding to a respective one third-color pixel region 113, and a blank region 614 is arranged as corresponding to a respective one highlight pixel region 114 (in this case, the highlight pixel region is a white pixel region). When there is a color resist 61 corresponding to each pixel area, a first color, a second color, a third color and white color can be displayed at respective positions of the first-color pixel region 111, the second-color pixel region 112, the third-color pixel region 113, and the highlight pixel region 114, respectively, thereby allowing the display panel to achieve display of colors. It should be noted that the blank region 614 refers to a region in a hollow position of the black matrix 51, in which no color resist is provided.

Preferably, projections of the pixel regions 11 on the color film substrate 20 cover the color resists 61 and the blank regions 614. That is, the area of each pixel region 11 is at least larger than the area of each color resist 61 or blank region 614. In other words, the black matrix 51 covers at least the gate lines 22, the data lines 21, and the source electrodes and drain electrodes of the thin film transistors 41, so as to avoid color cast or dark spots.

Preferably, the color resists include a red color resist, a green color resist, and a blue color resist. In this case, the first color resist 611, the second color resist 612, and the third color resist 613 can be a red color resist, a blue color resist, and a green color resist, respectively. Correspondingly, when the first-color pixel region 111 is a red pixel region, the second-color pixel region 112 is a blue pixel region, the third-color pixel region 113 is a green pixel region, and the highlight pixel region 114 is a white pixel region, a projection of the first-color pixel region 111 on the color film substrate 20 covers the red color resist, a projection of the second-color pixel region 112 on the color film substrate 20 covers the blue color resist, a projection of the third-color pixel region 113 on the color film substrate 20 covers the green color resist, and a projection of the highlight pixel region 114 on the color film substrate 20 covers the blank region 614.

Preferably, a width of the red color resist along the second direction Y is equal to a width of the blue color resist along the second direction; a width of the green color resist along the second direction is equal to a width of the blank region along the second direction;

and the width of the red color resist along the second direction is larger than the width of the blank region along the second direction.

Figure 8:
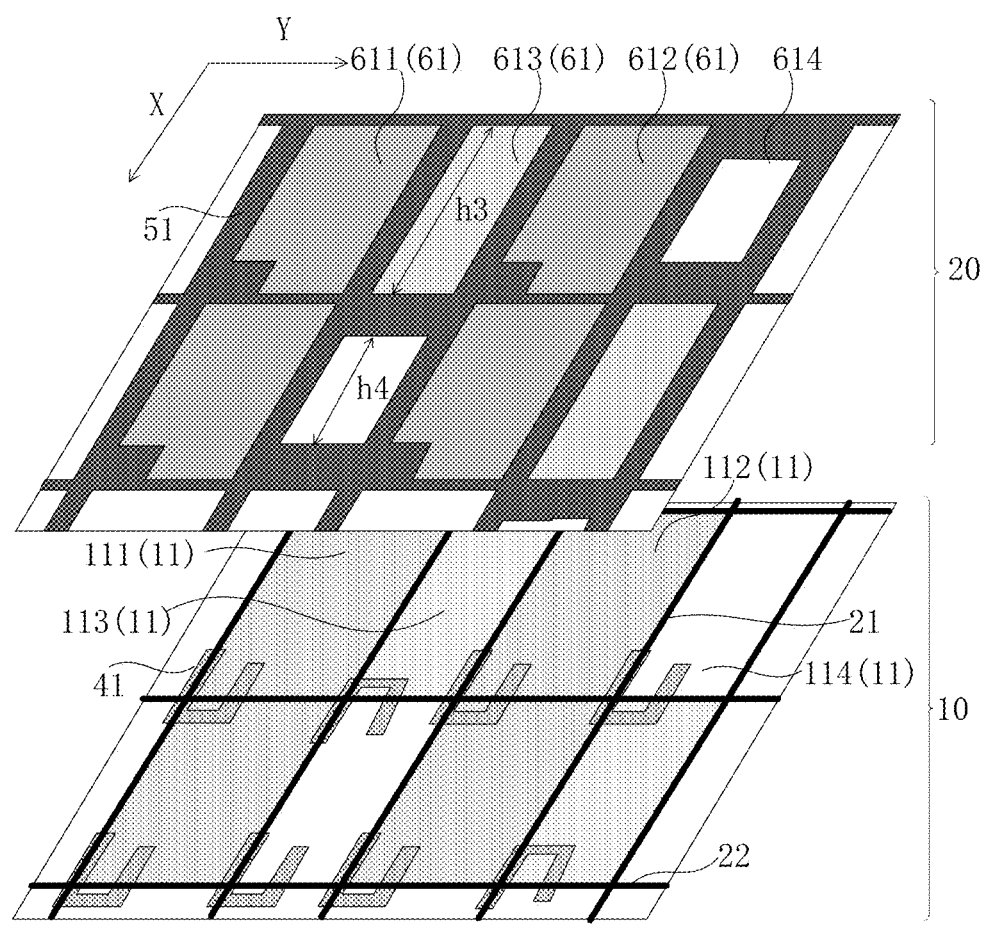
FIG. 8 is a schematic diagram of another display panel according to an embodiment of the present disclosure.

Optionally, with reference to FIG. 8, FIG. 8 is a schematic view of another display panel according to an embodiment of the present disclosure. A height of the red color resist along the first direction X is equal to a height of the blue color resist along the first direction, and a height h3 of the green color resist along the first direction X is larger than a height h4 of the blank region along the first direction. In this case, optionally, the green color resist and the blank region have different areas but similar shapes. As shown in FIG. 8, both the green color resistance and the blank region can be in a shape of rectangle or parallelogram.

In this way, the color film substrate of the display panel can be collaborated with the array substrate to achieve color displaying with high-resolution and high-brightness while avoiding color cast, moreover, the color gamut can be flexibly adjusted. In addition, the wiring of the gate lines and the data lines is simple, and the disconnection risk can be decreased.

The above description is a further detailed description of the present disclosure with reference to preferred embodiments, and it should be understood that the implementations of the present disclosure will not be limited to the description herein. A person skilled in the art may make a number of simple deductions or substitutions without departing from the concept of the present disclosure, which however shall be regarded as belonging to the protection scope of the present disclosure.

What is claimed is:

1. An array substrate, comprising:
a plurality of gate lines arranged along a first direction;
a plurality of data lines arranged along a second direction, wherein the plurality of gate lines intersects the plurality of data lines to define a plurality of pixel regions;
a plurality of pixel electrodes, each comprising a pixel sub-electrode and an electrode connecting structure connected to the pixel electrode, wherein the plurality of pixel electrodes corresponds to the plurality of pixel regions in one-to-one correspondence, such that each pixel sub-electrode is disposed in a corresponding pixel region of the plurality of pixel regions; and
a plurality of thin film transistors, wherein the plurality of thin film transistors corresponds to the plurality of pixel electrodes in one-to-one correspondence, and a drain electrode of each of the plurality of thin film transistors is electrically connected to a pixel sub-electrode of a corresponding pixel electrode of the plurality of pixel electrodes through a first through-hole and an electrode connecting structure of a corresponding pixel electrode of the plurality of pixel electrodes,
wherein the plurality of pixel regions comprise at least one first-color pixel region, at least one second-color pixel region, at least one third-color pixel region, and at least one highlight pixel region; the at least one first-color pixel region and the at least one second-color pixel region are alternately arranged along the first direction, the at least one third-color pixel region and the at least one highlight pixel region are alternately arranged along the first direction; the at least one first-color pixel region and the at least one second-color pixel region have a same area, and the at least one third-color pixel region and the at least one highlight pixel region have a same area; both the area of the highlight pixel region and the area of the third-color pixel region are smaller than both the area of the first-color pixel region and the area of the second-color pixel region, wherein a drain electrode, which is electrically connected to a pixel sub-electrode disposed in one third-color pixel region of the at least one third-color pixel region, is disposed in a highlight pixel region adjacent to the one third-color pixel region, each of the at least one first-color pixel region, each of the at least one second-color pixel region, each of the at least one third-color pixel region, and each of the at least one highlight pixel region have a same height along the first direction, and a width of each of the at least one first-color pixel region along the second direction is larger than a width of each of the at least one third-color pixel region along the second direction.

2. The array substrate according to claim 1, wherein in each of the at least one first-color pixel region, each corresponding pixel electrode and a drain electrode electrically connected to the pixel electrode are located in a same pixel region;

wherein in each of the at least one second-color pixel region, each corresponding pixel electrode and a drain electrode electrically connected to the pixel electrode are located in a same pixel region; and wherein in each of the at least highlight pixel region, each corresponding pixel electrode and a drain electrode electrically connected to the pixel electrode are located in a same pixel region.

3. The array substrate according to claim 1, wherein each of the at least one highlight pixel region is a white pixel region.

4. The array substrate according to claim 3, wherein each of the at least one first-color pixel region is a red pixel region, each of the at least one second-color pixel region is a blue pixel region, and each of the at least one third-color pixel region is a green pixel region.

5. The array substrate according to claim 4, wherein along the second direction, the red pixel region and the blue pixel region are alternately disposed, the green pixel region and the white pixel region are alternately disposed, and the red pixel region is disposed adjacent to the green pixel region.

6. The array substrate according to claim 1, wherein an area of a pixel sub-electrode disposed in each of the at least one first-color pixel region is equal to an area of a pixel sub-electrode disposed in each of the at least one second-color pixel region, and an area of a pixel sub-electrode disposed in each of the at least one third-color pixel region is larger than an area of a pixel sub-electrode disposed in each of the at least one highlight pixel region.

7. The array substrate according to claim 6, wherein a height of the pixel sub-electrode disposed in each of the at least one first-color pixel region along the first direction is equal to a height of the pixel sub-electrode disposed in each of the at least one second-color pixel region along the first direction; and a height of the pixel sub-electrode disposed in each of the at least one third-color pixel region along the first direction is larger than a height of the pixel sub-electrode disposed in each of the at least one highlight pixel region along the first direction.

8. The array substrate according to claim 6, wherein a width of the pixel sub-electrode disposed in each of the at least one third-color pixel region along the second direction is equal to a width of the pixel sub-electrode disposed in each of the at least one highlight pixel region along the second direction.

9. The array substrate according to claim 6, wherein a width of the pixel sub-electrode disposed in each of the at least one first-color pixel region along the second direction is larger than a width of the pixel sub-electrode disposed in each of the at least one third-color pixel region along the second direction.

10. The array substrate according to claim 1, wherein each of the plurality of data lines has a same shape.

11. The array substrate according to claim 10, wherein for one data line of the plurality of data lines disposed on any side of each highlight pixel region of at least one highlight pixel region, a portion of the one data line adjacent to the highlight pixel region is in a linear structure.

12. The array substrate according to claim 1, wherein each of the plurality of gate lines is in a linear structure extending along the second direction.

13. A display panel, comprising an array substrate, wherein the array substrate comprises:

a plurality of gate lines arranged along a first direction;

a plurality of data lines arranged along a second direction, wherein the plurality of gate lines intersects the plurality of data lines to define a plurality of pixel regions;

a plurality of pixel electrodes, each comprising a pixel sub-electrode and an electrode connecting structure connected to the pixel electrode, wherein the plurality of pixel electrodes corresponds to the plurality of pixel regions in one-to-one correspondence, such that each pixel sub-electrode is disposed in a corresponding pixel region of the plurality of pixel regions; and a plurality of thin film transistors, wherein the plurality of thin film transistors corresponds to the plurality of pixel electrodes in one-to-one correspondence, and a drain electrode of each of the plurality of thin film transistors is electrically connected to a pixel sub-electrode of a corresponding pixel electrode of the plurality of pixel electrodes through a first through-hole and an electrode connecting structure of a corresponding pixel electrode of the plurality of pixel electrodes, wherein the plurality of pixel regions comprise at least one first-color pixel region, at least one second-color pixel region, at least one third-color pixel region, and at least one highlight pixel region; the at least one first-color pixel region and the at least one second-color pixel region are alternately arranged along the first direction, the at least one third-color pixel region and the at least one highlight pixel region are alternately arranged along the first direction; the at least one first-color pixel region and the at least one second-color pixel region have a same area, and the at least one third-color pixel region and the at least one highlight pixel region have a same area; both the area of the highlight pixel region and the area of the third-color pixel region are smaller than both the area of the first-color pixel region and the area of the second-color pixel region, wherein a drain electrode, which is electrically connected to a pixel sub-electrode disposed in one third-color pixel region of the at least one third-color pixel region, is disposed in a highlight pixel region adjacent to the one third-color pixel region, each of the at least one first-color pixel region, each of the at least one second-color pixel region, each of the at least one third-color pixel region, and each of the at least one highlight pixel region have a same height along the first direction, and a width of each of the at least one first-color pixel region along the second direction is larger than a width of each of the at least one third-color pixel region along the second direction.

14. The display panel according to claim 13, further comprising a color film substrate disposed opposite to the array substrate.

15. The display panel according to claim 14, wherein the color film substrate comprises a grid-like black matrix, and a plurality of color resists and a plurality of blank regions, the grid-like black matrix includes a plurality of hollow positions, and the plurality of color resists and the plurality of blank regions are disposed at the plurality of hollow positions, and wherein the plurality of color resists corresponds to a part of the plurality of pixel regions in one-to-one correspondence, and the plurality of blank regions corresponds to another part of the plurality of pixel regions in one-to-one correspondence.

16. The display panel according to claim 15, wherein projections of the plurality of pixel regions on the color film substrate cover the plurality of color resists and blank regions.

17. The display panel according to claim 16, wherein the plurality of color resists comprises at least one red color resist, at least one green color resist, and at least one blue color resist;
a projection of each of the at least one first-color pixel region on the color film substrate covers a respective one of the at least one red color resist, a projection of each of the at least one second-color pixel region on the color film substrate covers a respective one of the at least one blue color resist, and a projection of each of the at least one third-color pixel region on the color film substrate covers a respective one of the at least one green color resist, and a projection of each of the at least one highlight pixel region on the color film substrate covers a respective one of the blank regions.

18. The display panel according to claim 17, wherein a height of each of the at least one red color resist along the first direction is equal to a height of each of the at least one blue color resist along the first direction; and a height of each of the at least one green color resist along the first direction is larger than a height of each of the blank regions along the first direction.

19. The display panel according to claim 18, wherein a width of each of the at least one red color resist along the second direction is equal to a width of each of the at least one blue color resist along the second direction; and a width of each of the at least one green color resist along the second direction is equal to a width of each of the blank regions along the second direction; and a width of each of the at least one red color resist along the second direction is larger than the width of each of the blank regions along the second direction.

* * * * *